United States Patent Office 3,525,276
Patented Aug. 25, 1970

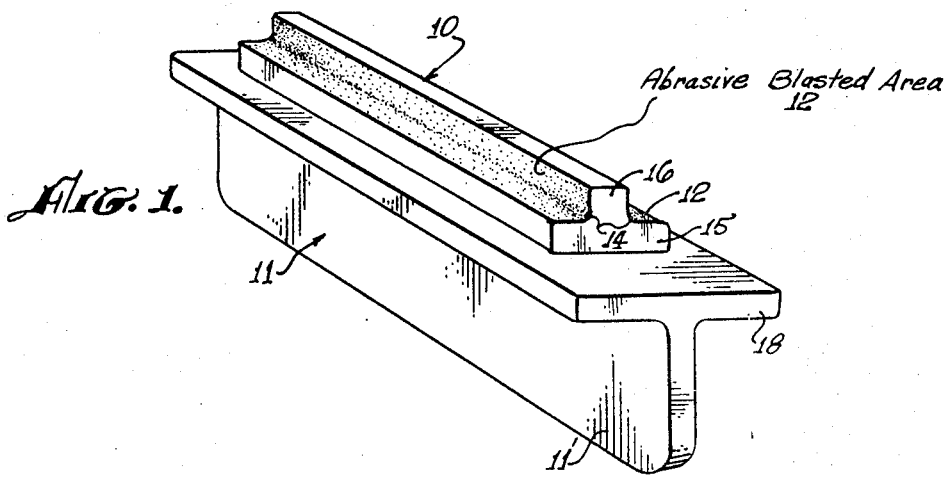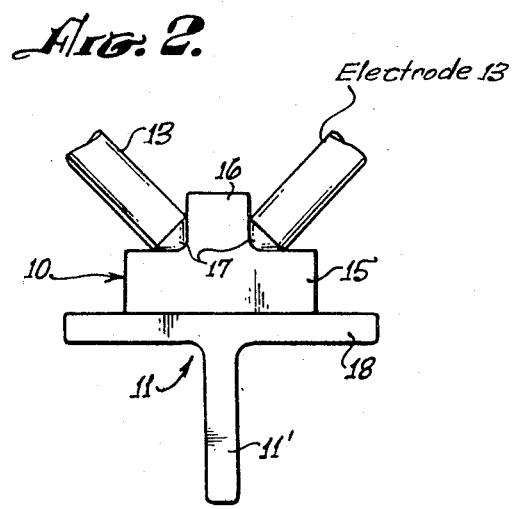

1

3,525,276
METHOD OF FABRICATING ELECTRODE
DRESSING TOOL
Eugene G. Freehauf, Ontario, Calif., assignor to General
Dynamics Corporation, a corporation of Delaware
Original application Dec. 30, 1966, Ser. No. 606,292, now
Patent No. 3,497,932, dated Mar. 3, 1970. Divided
and this application Oct. 9, 1968, Ser. No. 794,439
Int. Cl. B21k 21/00
U.S. Cl. 76—101                                  10 Claims

ABSTRACT OF THE DISCLOSURE

This disclosure relates to a structure and method of making an electrode dressing tool which is properly shaped, provided with cutting edges, and employed as a file to dress the faces of welding electrodes and provide same with the proper radii. The illustrated embodiment of the tool is produced by machining a bar of stock into a T-shaped form having suitable radii between the legs, abrasively blasting those radii areas to produce minute cutting or burnishing edges, and bonding the resultant article in an inverted position onto a T-shaped aluminum extrusion or the like to provide a square orientation. The cutting edges of the tool may be refurbished by an additional abrasive blast.

This application is a division of co-pending patent application Ser. No. 606,292, filed Dec. 30, 1966, now Pat. No. 3,497,932, issued Mar. 3, 1970.

BACKGROUND OF THE INVENTION

The invention relates to dressing tools and their method of frabrication, and more particularly to an electrode dressing tool and its method of fabrication for accurately forming the surfaces of the electrodes used in precision welding, such as 3-D module welding.

In welders of the type having cooperating electrodes relatively movable into and out of engagement with respect to one another and with respect to the work to be welded, the efficiency of the welds produced thereby depends to a great extent on the condition of the surfaces of the electrodes. For example, if the surfaces become corroded or uneven, the transmission of current through the work is curtailed with the result that the work will not be heated to the proper temperature for welding. Also, if the work engaging surfaces of the electrodes do not have a flat engagement with the work, the area of the weld and, consequently, the strength of the latter is reduced.

Various methods and apparatus have been utilized in the art to properly dress welding electrodes of the above mentioned type. The primary problem with the prior known dressing procedures is in the amount of downtime for each welder while the electrodes are interchanged and aligned properly or removed, dressed, replaced, and aligned.

SUMMARY OF THE INVENTION

The present invention provides a tool and method for manufacturing same which overcomes the problems existing in the prior known procedures for dressing welding electrodes. The present tool provides simultaneous reshaping or dressing of both electrodes, while mounted in the welder, in a manner to insure flat engagement between the surfaces of the electrodes used in precision surface welding, such as 3-D module welding, and to insure flat engagement of the work engaging surfaces of both electrodes and, at the same time, to clean or remove any corrosion from the surfaces.

2

Therefore, it is an object of this invention to provide a tool for dressing or reshaping elements.

A further object is to provide a method of fabricating an abrasive tool.

Another object of the invention is to provide a method for producing abrasive tools of various shapes.

Another object of the invention is to provide an electrode dressing tool and method of manufacturing same.

Another object of the invention is to provide an electrode dressing tool for precision surface welding apparatus, such as a 3-D module welding apparatus.

Another object of the invention is to provide a tool for simultaneously dressing plural electrodes in a manner to insure flat engagement.

Another object of the invention is to provide an electrode dressing tool for simultaneously dressing electrodes positioned in a welding apparatus and positioned at an angle with respect to each other in a manner to insure flat engagement therebetween and to insure flat end surfaces thereof.

Other objects of the invention not specifically set forth above will become readily apparent from the following description and accompanying drawings wherein:

BRIEF DESCRIPTION OF DRAWINGS

FIG. 1 is a perspective view of an embodiment of the inventive tool; and

FIG. 2 is an end view of the FIG. 1 tool positioned for dressing a pair of electrodes.

DESCRIPTION OF THE INVENTION

Referring now to the drawings, the embodiment of the tool illustrated comprises an inverted T-shaped member 10 constructed of suitable steel secured to a larger T-shaped member 11 constructed of aluminum. The member 10 is provided with minute cutting or abrasive areas 12 as shown in FIG. 1. The larger T-shaped member 11 serves as a handle or grasping means by which the user may insert the tool intermediate a pair of welding electrodes 13 as shown in FIG. 2 for reshaping and dressing the electrodes while being mounted in the welding apparatus. The T-shaped member 10, in this embodiment, is provided with curved surfaces 14 intermediate the intersection of the bar portion 15 and leg portion 16 thereof which corresponds to the desired curvature 17 of the electrodes to be dressed thereby. For example, the curved surfaces may each define a radius of about 0.012 inch while the bar portion 15 extends outwardly about 0.18 inch from the leg portion 16 with the leg portion 16 extending about 0.12 inch from the bar portion 15. The width and length of the T-shaped member will depend upon the various applications but may, for example, be about 0.5 inch wide and about 3 inches long while the T-shaped member 11 is about 4.5 inches in length and about 1 inch in width. The height of the leg portion 17 of member 11 is approximately the same as the width of the bar portion 18 thereof to provide sufficient gripping area for the user of the tool during dressing or reshaping operations. The T-shape of the handle or member 11 provides the user with "squareness" orientation for more accurate dressing of the electrodes 13.

The tool illustrated in FIG. 1 is fabricated as follows:
 (1) Machine shape from a flat ground stock or equivalent heat treatable steel the T-shaped member 10.
 (2) Dry abrasive blast the cutting surfaces or areas 12 with size 36 garnet grit. Blast lightly with two or three passes until the surfaces 12 are affected as desired.
 (3) Harden to a Rockwell C 63–65.
 (4) Pickle in suitable material to remove the scale caused from the heat-treating operation.
 (5) Bond the member 10 to the T-shaped member 10 of aluminum extrusion or equivalent with Eastman Kodak 910 bonding agent.

When the cutting areas 12 become glazed with copper, for example, from electrodes 13, the glaze can be readily removed by immersing these areas of the tool in a suitable copper stripping solution.

Also, when the cutting edges of areas 12 need refurbishing, this can be easily and effectively accomplished by one pass of abrasive blast as described above.

It has thus been shown that this invention provides a simple and economical method of producing abrasive tools of various shapes and specifically illustrates an embodiment of such a tool which:

(1) Is effective in dressing faces and applying radii to elements such as welding electrodes.

(2) Requires a minimum of production personnel training to utilize the tool.

(3) Involves no set-up time to make attachments.

(4) Can be readily cleaned.

(5) Utilizes cutting edges which can be easily and inexpensively refurbished.

While the invention has been illustrated and described as an electrode dressing tool and method of making same, it is not intended to limit the invention to this specific embodiment or use, since the inventive concept may be utilized for producing various shaped abrasive tools such as files that would otherwise be impractical to make due to the curved nature of the cutting surface thereof.

Although a particular embodiment and fabrication method for same has been illustrated and described, modifications will become apparent to those skilled in the art, and it is intended to cover in the appended claims all such modifications as come within the true spirit and scope of the invention.

What I claim is:

1. The method of fabricating a tool having an abrasive type cutting surface thereon comprising the steps of: forming the tool from heat treatable material, blasting desired areas with abrasive material to define the cutting surfaces, hardening the tool to the desired hardness, and removing scale from the tool created by the hardening operation.

2. The method defined in claim 1, wherein the step of blasting with abrasive material is accomplished by lightly blasting the desired cutting surfaces with garnet grit.

3. The method defined in claim 1, wherein the forming step is accomplished by machining the tool from heat treatable metal so as to define a T-shaped configuration.

4. The method defined in claim 3, wherein the cutting surfaces of the tool are defined by blasting the areas of the T-shaped configuration on each side thereof adjacent the intersection of the leg and bar portions thereof.

5. The method defined in claim 4, wherein the T-shaped tool includes curved surfaces adjacent the intersection of the leg and bar portions thereof.

6. The method defined in claim 5, wherein the cutting surfaces are formed by dry blasting with garnet grit of about size 36.

7. The method defined in claim 6, wherein the tool is hardened to a Rockwell C hardness.

8. The method defined in claim 3, additionally including the step of securing the T-shaped tool to a handle-like member such that the T-shaped portion thereof is inverted.

9. The method defined in claim 1, additionally including the step of cleaning the cutting surfaces thereof by immersing same in a solution suitable for stripping the undesirable material therefrom.

10. The method defined in claim 1, additionally including the step of refurbishing the cutting surfaces thereof by blasting same with abrasive material.

References Cited

UNITED STATES PATENTS

| | | | |
|---|---|---|---|
| 2,970,393 | 2/1961 | Freeman | 51—320 XR |
| 3,069,810 | 12/1962 | Blackman et al. | 51—320 XR |

BERNARD STICKNEY, Primary Examiner

U.S. Cl. X.R.

51—319, 320